United States Patent [19]

Schumann et al.

[11] 3,925,211

[45] Dec. 9, 1975

[54] POLYIMIDE MEMBRANE AND PROCESS FOR MAKING SAME

[75] Inventors: Wilhelm Schumann; Heinrich Strathmann, both of Tubingen, Germany

[73] Assignee: Forschungsinstitut Bergof GmbH, Tubingen, Germany

[22] Filed: Apr. 8, 1974

[21] Appl. No.: 458,483

[30] Foreign Application Priority Data

Apr. 12, 1973 Germany............................ 2318346

[52] U.S. Cl............................... 210/500 M; 264/41
[51] Int. Cl.²......................................... B01D 31/00
[58] Field of Search............ 210/23, 321, 433, 490, 210/500 M; 264/41, 49, 177, 200, 210 F, 258, 277, 279

[56] References Cited

UNITED STATES PATENTS

| 3,228,876 | 1/1966 | Mahon................................ 210/22 |
| 3,615,024 | 10/1971 | Michaels............................ 210/490 |
| 3,724,672 | 4/1973 | Leonard et al. .................... 210/500 |
| 3,816,303 | 6/1974 | Wrasidlo............................ 210/500 |
| 3,822,202 | 7/1974 | Hoehn ............................ 210/321 X |

*Primary Examiner*—Frank A. Spear, Jr.
*Attorney, Agent, or Firm*—Robert A. Cesari; John F. McKenna; Andrew F. Kehoe

[57] ABSTRACT

The present invention relates to semipermeable asymmetric membranes and to a process for preparing them. These membranes are especially suitable for use in ultrafiltration and reverse osmosis.

7 Claims, No Drawings

POLYIMIDE MEMBRANE AND PROCESS FOR MAKING SAME

Background of the Invention

Successful ultrafiltration and reverse osmosis require highly efficient semipermeable membranes. The membranes must fulfill certain requirements with regard to their selectivity, filtration flux, and their chemical, thermal and mechanical stability.

Asymmetric membranes have a porous structure, the average pore size being in the range of from 0.1 to $1/u$, which has an extremely thin homogeneous layer on the upper side which is the actual membrane, while the porous substructure serves only as a support and has no influence on the filtration characteristics. Since the active layer determining the filtration flux of the asymmetric membranes is extremely thin (0.1 to $0.5\mu$), relatively high filtration fluxes are possible.

Asymmetric membranes are usually prepared by a so-called precipitation or phase inversion reaction. For this purpose, the polymer used for preparing the membrane is dissolved in a suitable solvent, spread into a film, and precipitated in a non-solvent.

Most of the membranes used at present especially for the desalination of sea-water are made from cellulose acetate. However, cellulose acetate has certain disadvantages with regard to its chemical, thermal and mechanical stability. Furthermore, it is not resistant to bacterial attack. Thus, there is considerable interest in the development of new membranes for desalting sea-water which have improved properties, particularly an improved chemical, thermal and mechanical stability.

Summary of the Invention

It is the object of the present invention to provide asymmetric membranes having significantly improved properties, including resistance to compaction, heat resistance and chemical resistance which may be used, particularly, but not exclusively, for the desalination of sea-water.

These objects have been achieved by forming an anisotropic membrane of a solvent soluble film-forming prepolymer and then connecting it into an insoluble polymeric final membrane product. The polymer class of polyimides have an excellent thermal, chemical and mechanical stability. It was found, however, that on account of their insolubility in all solvents coming into consideration these polymers cannot be made into asymmetric membranes by means of the usual precipitation reaction. For this reason, it has only been possible to make homogeneous films from polyimides, up to now.

The object of the present invention, i.e. the preparation of asymmetric membranes from polyimides, was achieved by first preparing membranes having asymmetric structures from acid amides capable of being converted to polyimides according to the usual precipitation or phase inversion reaction and subsequently converting these acid amide membranes to polyimide membranes by a thermal or chemical ring closure reaction.

In the following, a reaction scheme is shown starting from a tetracarboxylic acid dianhydride and a diamine to form, via an acid amide, a polyimide:

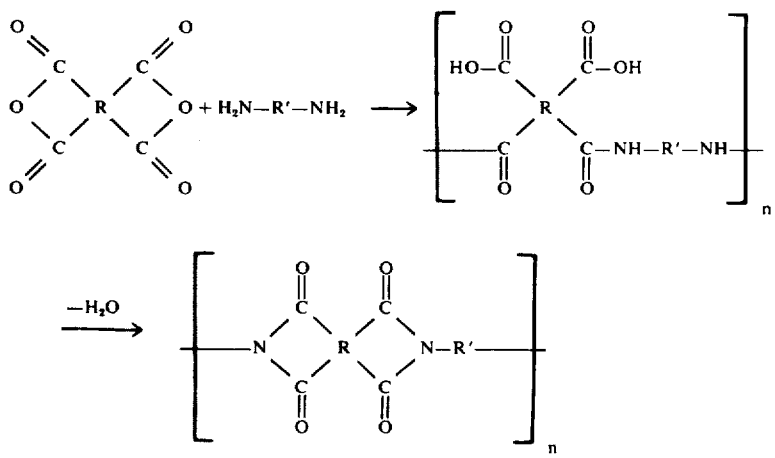

wherein R and R' are aliphatic or aromatic groups and n is in each case selected to achieve a film-forming prepolymer.

By reacting the dianhydride, or some equivalent reactant such as an acid chloride or the like, and the diamine in an appropriate solvent at room temperature, a polyamide is obtained in the form of a soluble polymer. This polyamide can be converted to the corresponding polyimide by heating to 300°C or by chemical reaction.

Polyimides can also be made by other methods, for example, by reaction of dianhydrides with other nitrogen-bearing polyfunctional compounds such as diisocyanates.

For the preparation of the asymmetric polyimide membranes, the diacid anhydride and the diamine are reacted at room temperature in an appropriate solvent, the polymer solution is then spread into a thin film and precipitated in a suitable precipitation bath. The asymmetric polyamide membrane so obtained is converted to the asymmetric polyimide membrane by heating to 300°C or by chemical reaction.

The following Examples serve to illustrate the preparation of various polyimide membranes. The following Examples are carried out according to well known manipulative procedures preferably in the absence of oxygen at a temperature sufficiently low to allow formation of a film-forming prepolymer.

EXAMPLE 1

9.2 g of benzidine are dissolved in 170 g of anhydrous N-methylpyrrolidone in the absence of air and moisture. The solution is cooled to 5°–10°C and 10.9 g of pyromellitic anhydride are added in portions. The resulting solution is stirred for 12 hours at 5°–10°C and, subsequently, the viscous solution is pressure filtered and then centrifuged. The clear yellowish and viscous solution obtained is spread out on a glass plate to form a 0.3 mm thick film and put into acetone at 10°C. After 1 minute, the plate is removed and placed in a solution consisting of 4 g of N,N'-dicyclohexylcarbodiimide in 400 ml of anhydrous acetone for 24 hours. Thereupon, the asymmetric polyimide membrane thus formed is placed for several hours in ethanol at room temperature. The alcohol is changed several times and then slowly diluted with water. Finally, the membrane is placed in pure water.

EXAMPLE 2

9.2 g of benzidine are dissolved in 170 g of anhydrous N-methylpyrrolidone in the absence of air and moisture. The solution is cooled to 5°–10°C and a total of 10.9 g of pyromellitic anhydride are added in portions. After the addition has been completed, the whole is stirred for 12 hours. The resulting highly viscous solution is pressure filtered and then centrifuged. This solution is spread into a thin film on a glass plate and immersed in acetone. The resulting membrane is then placed into a mixture of benzene : pyridine : acetic anhydride ( 2 : 1 : 1 ) where it is left for 24 hours. Subsequently, the membrane is quickly dipped into acetic acid and then placed in ethanol for 1 hour. The membrane is then dried well and heated to 300°C for 15 minutes.

EXAMPLE 3

5 g of 4-aminophthalandione acetate are dissolved in 7 g of anhydrous pyridine in the absence of air and moisture and this solution is stirred for 24 hours at 50°C. Thereupon, it is pressure filtered and centrifuged. The viscous solution is spread into a thin film on a glass plate and immersed in acetone. The resulting membrane is then placed in a solution of 4 g of N,N'-dicyclohexylcarbodiimide in 400 ml of anhydrous acetone for 24 hours. Subsequently, the acetone solution is replaced by ethanol. After 24 hours, the membrane is placed in pure water.

EXAMPLE 4

3 g of 4-aminophthalandione are dissolved in 5 g of dimethylacetamide in the absence of air and moisture and stirred for 24 hours at 70°C. The resulting viscous solution is pressure filtered and centrifuged. The solution is spread into a thin film on a glass plate and immersed in acetone. The membrane thus formed is placed in a mixture of benzene : pyridine : acetic anhydride ( 2 : 2 : 1 ) for 24 hours. Subsequently, it is dipped quickly into acetic acid and then placed for 1 hour in ethanol. The membrane is then dried and then heated for 15 minutes at 300°C.

The following reaction scheme illustrates the course of the reaction described in Examples 3 and 4:

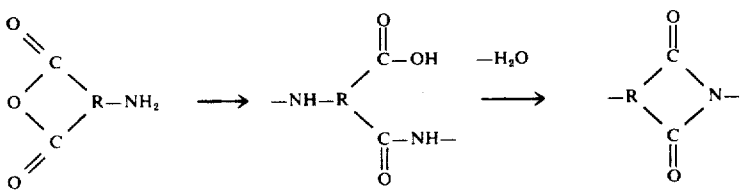

EXAMPLE 5

9.2 g of benzidine are dissolved in 170 ml of anhydrous dimethylacetamide in the absence of air and moisture. The solution is cooled to 5°–10°C and a total of 10.9 g of pyromellitic anhydride is added in portions. After the addition had been completed, the solution is stirred for 12 hours and then pressure filtered and centrifuged. The viscous solution is spread into a thin film on a glass plate and then immersed into acetone. The resulting membrane is then placed for 24 hours in a solution of 2.6 g of imidazole and 1 g of triphenyl phosphate in 20 ml of triethylamine at 40°C. Finally, the membrane is dipped quickly in acetic acid and then stored in water.

EXAMPLE 6

4.6 g of benzidine are dissolved in 80 ml of dimethylacetamide in the absence of air and moisture and then 10.9 g of pyromellitic anhydride are added in portions at 5°–10°C. Subsequently the solution is stirred for 12 hours. It is then pressure filtered and centrifuged. A thin film is spread into a glass plate which is then immersed in a solution of nicotinic acid anhydride in acetone for 24 hours at 35°C. Thereupon, the membrane is placed for several hours in ethanol and then in water.

EXAMPLE 7

9.2 g of benzidine are dissolved in 150 ml of anhydrous dimethylacetamide in the absence of air and moisture. A total of 10.9 g of pyromellitic anhydride is then added portionwise while the temperature is maintained at 5°–10°C. After the addition has been completed, the mixture is stirred for 12 hours and then pressure filtered and centrifuged. The viscous solution is spread into a thin film on a glass plate which is then immersed in acetone. The resulting membrane is placed in a solution of phosphorous dichloronitride trimer in heptane for 24 hours at 50°C and subsequently for several hours in ethanol and then in water.

The filtration characteristics of some polyimide membranes are listed in the following Table:

Filtration characteristics of some asymmetric polyimide membranes suitable for the desalination of water

| Polymer | Solvent | Precipitation bath | Cyclization to imide | Flux in cm/sec at 100 atm. | $R_{Mg^{2+}}$ % | $R_{Cl^-}$ % |
|---|---|---|---|---|---|---|
| PSA + Benz. 14 % | NMP | Acetone 0°C | Ac. + CDI | $1 \times 10^{-5}$ | 99 | 99 |
| " | NMP | 2.5′ Ac. 0° | " | $4 \times 10^{-5}$ | 99 | 99 |
| " | NMP | 5′ Ac. 0° | " | $4 \times 10^{-5}$ | 99 | 99 |
| " | DMAc | 1′ Ac. 20° | " | $19 \times 10^{-5}$ | 99 | — |
| " 10.5 % | NMP | 1′ Ac. 10° | " | $10 \times 10^{-5}$ | 99 | 99 |

PSA = pyromellitic anhydride
Benz. = benzidine
NMP = N-methylpyrrolidone
DMAc = dimethylacetamide
Ac. = acetone
CDI = N,N′-dicyclohexylcarbodiimide The asymmetric polyimide membranes according to the invention are not only suitable for the desalination of water, but by regulating the parameters in the production of the pre-polymer, the ultrafiltration properties of the final membrane product may be modified in such a manner as to have exactly defined pore sized and thus may be used for the ultrafiltration of macromolecular solutions. Regulation of the parameters is carried out according to procedures known in the art related to asymmetric (sometimes called anisotropic or skin-type) membranes. They can be made reproducibly with molecular cutoff boundaries of from about 1000 to 100,000 molecular weight. Owing to their sensitivity to temperature, they can be sterilized in the autoclave at 120° to 160°C and are, therefore, especially suitable for use in medical and biochemical laboratories. They can be prepared in the form of foils and tubes and, furthermore, spun into asymmetric hollow fibers.

We claim:

1. A process for making asymmetric semipermeable, polyimide membranes of the type useful in ultrafiltration and desolination process comprising the steps of
   a. casting a film of a solution of a reactive prepolymer
   b. precipitating an asymmetric membrane structure of said prepolymer by contacting said prepolymer with a precipitating bath; and
   c. increasing the chemical and thermal stability of said asymmetric membrane by subjecting said prepolymer membrane to a thermal or chemical ring-closure step.

2. A process as defined in claim 1 wherein said reactive prepolymer is a polyamide and wherein said ring-closure step converts said polyamide to a polyimide.

3. A process as defined in claim 2 wherein said polyimide membrane is insoluble.

4. A process as defined in claim 2 wherein said polyamide is formed by reacting pyromelletic anhydride and benzidine.

5. A process as defined in claim 1 wherein said ring-closure step converts said prepolymer structure to an insoluble structure.

6. A semipermeable asymmetric polyimide of the type useful in reverse osmosis and ultrafiltration process membrane formed by a process comprising the steps of
   a. casting a film of a solution of a reactive prepolymer
   b. precipitating an asymmetric membrane structure of said prepolymer by contacting said prepolymer with a precipitating bath; and
   c. increasing the chemical and thermal stability of said asymmetric membrane by subjecting said prepolymer membrane to a thermal or chemical ring-closure step.

7. An asymmetric membrane as defined in claim 6 wherein said prepolymer is a polyamide and wherein said ring-closure step forms a polyimide, said polyimide being insoluble and resistant to thermal environment of at least 120°C.

* * * * *

UNITED STATES PATENT OFFICE
CERTIFICATE OF CORRECTION

Patent No. 3,925,211          Dated December 9, 1975

Inventor(s) Wilhelm Schumann, et al

It is certified that error appears in the above-identified patent and that said Letters Patent are hereby corrected as shown below:

Column 3, line 46    "(2:1:1)" should be --(2:2:1)--;

Column 5, line 23    "sized" should be --sizes--;

Signed and Sealed this thirtieth Day of March 1976

[SEAL]

Attest:

RUTH C. MASON
*Attesting Officer*

C. MARSHALL DANN
*Commissioner of Patents and Trademarks*